Jan. 23, 1934.   H. B. GREENING   1,944,426
SHEAVE FOR WIRE CABLES
Filed Dec. 12, 1931
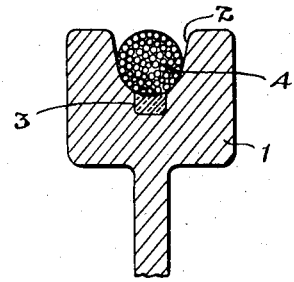
Fig. 1.
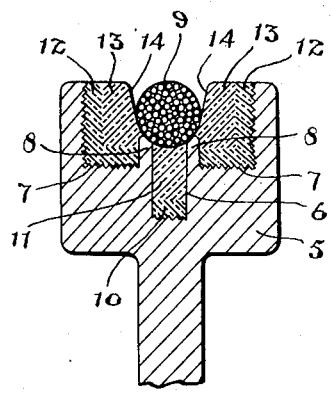   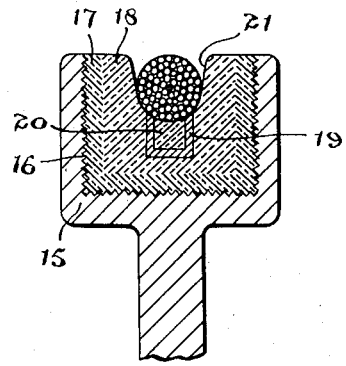
Fig. 2.   Fig. 3.
Inventor.
Herald B. Greening.

Patented Jan. 23, 1934

1,944,426

UNITED STATES PATENT OFFICE 1,944,426

SHEAVE FOR WIRE CABLES

Herald B. Greening, Hamilton, Ontario, Canada, assignor to Galloway Engineering Company Limited, Hamilton, Canada Application December 12, 1931
Serial No. 580,639

9 Claims. (Cl. 64—17)

The principal objects of this invention are to reduce to the minimum the wear and deterioration of wire cables and to devise a form of sheave, the groove of which is provided with a resilient bottom which will permit the outward dilation of the individual wires of the cable around the inner surface contacting with the perimeter of the groove of the sheave.

The principal feature of the invention consists in the novel arrangement of a narrow strip of rubber housed within a groove circumferentially arranged at the base of the cable groove and in providing a structure of sheave in which the cable is supported on metal surfaces at either side of the central groove.

A further and important feature consists in the novel arrangement of rubber rings to form the side contacting surfaces to engage the sides of the wire cable.

In the accompanying drawing, Figure 1 is a cross sectional view of the rim of a cable sheave embodying the simplest form of my invention.

Figure 2 is a cross-sectional view of the rim of a cable sheave illustrating a modification of the invention.

Figure 3 is a cross-sectional view of a cable sheave illustrating a further modification.

It has been ascertained by careful observation in numerous experiments that the maximum wear of a wire cable occurs on the inward side of the cable engaging the sheave and that much of the wear and deterioration in the life of the cable is caused by the dilation of the small wires of which the cable is constituted in the sharp bending around the sheave. This dilation takes the form of the tendency of the small loops of wire forming the spirals of the smaller composite wires forming the cable, which when the cable is bent are sprung outwardly and in the normal operation of the cable on a steel sheave these small dilated loops are crushed out of shape. A continuous action of this kind naturally wears the cable rapidly.

In the simplest form of my invention as illustrated in Figure 1 the rim of the sheave 1 has formed at the bottom of the tapering cable groove 2 a narrow deep groove 3 and in this groove 3 is embedded an endless band of rubber. This rubber is of the quality ordinarily used in the tread stock of automobile tires. It is very resilient but tough and very effectively resists wear. The rubber is suitably bonded and preferably vulcanized in place and forms a bearing for the inward surface of the wire cable 4 as it is drawn tightly into the sheave groove 2.

It has been ascertained that the maximum dilation of the small wires of the cable occur substantially in the inner centre line or in the axial plane of the cable corresponding with the radial centre of the sheave groove consequently provision of this small rubber band in the narrow groove permits this dilation without injury and the cable operates at higher speeds and with less injury than when operated upon a solid metal sheave.

In the form illustrated in Figure 2 the sheave rim 5 is formed with quite a deep central groove 6 and two annular side grooves 7. These side grooves are preferably separated from the central groove by the annular narrow metal strips 8, the outward perimeters of which are shaped to fit the contour of the cross-section of the cable 9.

The inner surface of the groove 6 is preferably roughened and a circular strip of rubber 10 of a somewhat hard quality and capable of bonding with the steel surface is inserted therein.

A strip of rubber 11 is inserted over the rubber strip 10 and completes the bottom of the cable seat.

The rubber strip 11 is preferably formed of the quality of material used for automobile tire treads and is quite resilient and resistant to wear.

Rubber bands 12, which are of an L shape in cross section, are inserted into the grooves 7 which are also roughened or knurled and the quality of rubber of these bands corresponds with that of the band 10.

Rubber rings 13 are nested into the rings 12 and are formed with the sloping inward sides 14 to form the sloping surfaces of the cable groove of the sheave.

These several composite rings are vulcanized into the sheave rim 5 and a bottom surface and side walls of tire tread rubber stock are provided, relieving the dilation or kinking of the small wires and also relieving the small wires along the sides of the cable from the detrimental crushing effect of the tapering walls in an ordinary steel rim.

In the form shown in Figure 3 the sheave rim 15 is formed with a deep rectangular groove 16 and embedded in this and engaging the bottom and side walls thereof is a band of rubber 17 of a hard quality similar to the rings 10 and 12 in Figure 2.

A ring of rubber 18, preferably of tire tread stock, is fitted into the ring 17 and embedded in this ring is a metal ring 19 preferably of U- shape in cross section, presenting two metal surfaces at the bottom of the sheave groove arranged either side of a central ring of rubber 20.

The ring 19 presents metal surfaces similar to the surfaces 8 shown in Figure 2 but this ring is embedded in the rubber of the ring 18 and is cushioned thereby so that the entire strain of the pull of the cable is relieved, not only by the rubber of the ring 18 beneath the U-shaped ring 19, but by the rubber forming the tapering side walls of the sheave groove 21.

It will be understood that the various forms of the invention herein shown and described have as their basic feature the arrangement of a body of rubber centrally arranged at the bottom of the sheave groove provided for the purpose as herein described of relieving the crushing effect upon the small wires of the cable as they are dilated in bending around the sheave.

It is important to note that in the forms of the invention illustrated herein the actual bottom of the groove on which the cable rests is represented by a combined metallic and cushioning contact surface. The cushioning surface is concentric with the curved bottom of the metal element and a continuous support of two characteristics is presented to the underside of the cable in passing over the sheave.

A smooth running rigid or semi-rigid foundation of a desired firmness is thus provided for the cable while avoiding wear on the dilated central inner wire strands and minimizing the destructive inward crushing action encountered where the cable is allowed to jamb between two sharply sloping sheave walls.

Several forms of application of the invention have been herein shown and from these it will be readily understood that other forms may be devised without departing from the principal feature as herein set forth.

What I claim as my invention is:

1. A sheave for wire cables having a circumferential groove presenting cable supporting surfaces at either side of the median plane and spaced therefrom conforming in curvature to the cross sectional curvature of the cable, and an endless band of rubber embedded in the space between said curved surfaces and engaging and resiliently supporting the central inside peripheral portion of the cable without distortion coincident with the support of the spaced curved surfaces.

2. A sheave for wire cables formed with a circumferential groove shaped in cross section to conform to the cross sectional curvature of the cable and having a narrow groove arranged centrally at the bottom thereof, and an endless band of rubber embedded in said narrow groove adapted to engage the central peripheral portion of the cable, said rubber band being capable of resilient distortion under load to relieve the compression pressure on individual wires in the cable and affording peripheral support to the central portion of the rope coincident with and substantially equal to the support of the curved side portions of the cable by the adjacent curved surfaces of the sheave.

3. A sheave for wire cables having a circumferential groove shaped in cross section to conform to the closs sectional curvature of the cable and having a narrow centrally arranged groove at the bottom thereof, and an endless band of rubber material embedded in said narrow groove adapted to engage and support the central peripheral portion of the rope, said resilient band being capable of resilient distortion under load and affording continuous support to the central portion of the cable when under compression substantially equal to the support of the adjacent curved surfaces of the sheave and permitting the temporary deformation of the cable wires without fracture or undue wear.

4. A rope sheave having a metal rim with a central groove cut therein, a ring of wear-resisting rubber stock embedded centrally in said groove, said rim having annular metal surfaces at the sides of said rubber ring presenting exposed running contacts for the cable, said rim having annular grooves at the outward sides of said annular metal surfaces, and rings of wear-resisting rubber material embedded in the latter grooves and presenting sloping wear-resisting sides of a cable groove adjacent to the exposed annular metal contact surfaces, said annular metal surfaces providing a positive contact with the rope to restrict excessive pressure contact or embedment of the rope in the bottom and side rubber rings.

5. A rope sheave presenting a resilient frictional cushion contact at the bottom and sides respectively to engage the respective portions of the rope, and means presenting an annular metallic contact with said rope between said respective bottom and side resilient contacts and limiting embedment of the rope therein.

6. A rope sheave having in combination a rim, a resilient grooved ring of rubber carried in said rim and presenting friction and cushion contact with the rope, and means presenting exposed metallic surfaces in the wall of the ring groove circumferentially of the rim to limit pressure contact of the rope with said grooved rubber ring.

7. A rope sheave having a resilient ring of rubber mounted peripherally thereof and presenting a rope receiving groove, and a floating metallic ring presenting a metallic contact with said rope circumferentially of said groove.

8. A rope sheave having a resilient ring of rubber mounted peripherally thereof and presenting a rope receiving groove, and a metallic ring embedded in said resilient rubber ring below said groove and presenting metallic contact to the rope.

9. A rope sheave having a resilient ring of rubber mounted peripherally thereof and presenting a rope receiving groove, a ring of rigid material of channel cross section embedded in said rubber ring below the groove with the channel walls disposed outwardly and terminating substantially flush with the wall of the groove and forming a circumferential running contact for the rope, and a filling of resilient rubber fitting in the channel of said ring of rigid material between the side walls thereof and presenting a cushioning contact to the rope therebetween.

HERALD B. GREENING.